(12) United States Patent
Zhu et al.

(10) Patent No.: US 7,293,367 B1
(45) Date of Patent: Nov. 13, 2007

(54) POWER-OPERATED TAPE MEASURE

(75) Inventors: Wenjiang Zhu, Yuyao (CN);
Zhonghua Huang, Yuyao (CN)

(73) Assignee: Ningbo Great Wall Precision Industrial Co., Ltd., Yugao, Zhejing Province (CN)

( * ) Notice: Subject to any disclaimer, the term of this patent is extended or adjusted under 35 U.S.C. 154(b) by 0 days.

(21) Appl. No.: 11/466,837

(22) Filed: Aug. 24, 2006

(30) Foreign Application Priority Data

Jun. 7, 2006 (CN) .................. 2006 1 0051847

(51) Int. Cl.
*G01B 3/10* (2006.01)
(52) U.S. Cl. ......................... 33/755; 33/761
(58) Field of Classification Search .............. 33/755, 33/759, 760, 761
See application file for complete search history.

(56) References Cited

U.S. PATENT DOCUMENTS 4,551,847 A * 11/1985 Caldwell .............. 33/755
5,440,820 A * 8/1995 Hwang ................ 33/761
5,448,837 A * 9/1995 Han-Teng ............. 33/761
5,471,761 A 12/1995 Cheng

FOREIGN PATENT DOCUMENTS

CN 94245836.2 2/1996

* cited by examiner

*Primary Examiner*—Christopher W Fulton
(74) *Attorney, Agent, or Firm*—Global IP Services; Tianhua Gu

(57) ABSTRACT

A power-operated tape measure includes an annular reel pivotally mounted on a fixing shaft in a case, a tape wound on the annular reel, a hook at one end of the tape extending out of the case through an outlet of the case. A motor respectively drives the annular reel and a large wheel for sending the tape via a gear train. A control circuit includes the motor, a power supply unit and a control switch controlling the motor for direct and reverse turning. A button member at the bottom of the case that can float upwards and downwards, inside which a small wheel is pivotally fixed to engage with the large wheel for sending the tape. The control switches control the extending of the tape and the withdrawal of the tape, the switch controlling the extending of the tape engaging the inside part of the button member.

12 Claims, 3 Drawing Sheets

B-B

POWER-OPERATED TAPE MEASURE

CROSS REFERENCE TO THE RELATED PATENT APPLICATION

This patent application claims the priority of the Chinese patent application No. 200610051847.8, filed on Jun. 7, 2006.

FIELD OF THE INVENTION

This invention relates to the field of industrial measuring instruments, especially power-operated tape measures.

BACKGROUND OF THE INVENTION

When using a common tape measure, you have to pull the tape out directly by hand and withdraw the tape by the returning force of the spring, which is very inconvenient. Therefore, Chinese patent No. 94245836, titled "Multifunctional Power-Operated Measure" presents a structural design. It includes a case, a withdrawing reel, a guiding axle, a permanent magnet motor with worm, a withdrawing reel of the worm wheel tape, a clutch mounted between the said worm wheel and the withdrawing reel of the tape, an auto-reset button switch controlling the motions of the tape measure and a battery unit consisting of 4 batteries in series. Though it has many advantages as described, there are still many drawbacks. For instance, too complex in structure, too many useless-functions, inconvenient in manufacture as well as too many measuring devices being crowded in the case to get stuck in the tape measure and to cause the stability decline obviously. Furthermore, there is a major defect in the transmission design of this kind of power-operated tape measure. In fact, it is not practical to realize the withdrawal or sending of the tape merely by the direct or reverse turning of the motor, because during the course of taking out the tape, the tape is often blocked, resulting in the difficulty in swift and smooth sending or withdrawal, which influences the normal operation and measurement. Another example is U.S. Pat. No. 5,471,761, titled "Power-Driven Tape Measure", which consists of a case, an annular reel, a tape, a motor, a power supply and control switches. The annular reel is pivotally mounted on the fixing shaft of the case, the tape is wound on the annular reel, the hook at one end of the tape is extending out of the case through the outlet of the case, the motor drives the connecting the annular reel and the large wheel for sending the tape on the tape respectively via the gear train, the control circuit consisting of a motor, a power supply unit and a control switch controls the motor for direct and reverse turning, the control switches are engaged with the braking teeth matching the duplex gear disc in the gear train via the link mechanism. This patent is compact in structure and small in size. However, it also realizes the sending or withdrawal of the tape merely by the direct and reverse turning of the motor. Moreover, it requires the cooperation with the braking teeth, resulting in inconvenient operation and the aforesaid drawbacks, e.g., blockage of the tape when being sent out and great friction due to the tape's clinging to the wheel when drawing back. Therefore, further improvement is still required.

SUMMARY OF THE INVENTION

This invention is intended to provide a practical and reliable power-operated tape measure with simple structure and convenient operation so as to solve the aforesaid drawbacks and to ensure swift and smooth sending and withdrawal of the tape.

This invention adopts the following technical solution to solve the aforesaid technical problems: a tape measure includes a case, an annular reel, a tape, a motor, a power supply unit and control switches, the annular reel pivotally mounted on a fixing shaft of the case. The tape winds on the annular reel, a hook at one end of the tape extends out of the case through the outlet of the case. The motor respectively drives and connects the annular reel and the large wheel for sending the tape via the gear train. A control circuit comprises the motor, the power supply unit and the control switch that controls the motor for direct and reverse turning. The control circuit is featured by that the said case is equipped with a button member at the bottom side that can float upwards and downwards, inside which a small wheel is pivoted on a shaft and engaged with the large wheel for sending the tape on the annular reel. The control switches includes a switch for controlling the extending of the tape and a switch for controlling the withdrawal of the tape respectively, the switch for controlling the extending of the tape engaging with the internal part of the button member of the case.

As a further improvement, the said switch for controlling the withdrawal of the tape is mounted on the upper front of the case, together with the buttons on the case to facilitate single-hand operation for the power-operated tape measure. The control switch mounted on upper case is suitable for operation by thumb and the control switch mounted on bottom case is suitable for operation by forefinger or middle finger.

Further, the said gear train comprises a first stepped in-line gear, a second stepped in-line gear, a duplex gear disc, a transition gear and a tape gear. The first stepped in-line gear, the second stepped in-line gear, the transition gear and the tape gear are mounted in the case with locating shafts. The duplex gear disc is mounted on the flange of the circumference of the annular reel via the one-way transmission detent-type clutch member. The large gear of the first stepped in-line gear is engaged with the small gear of the output shaft of the motor, and the small gear of the in-line gear is engaged with the large gear of the second stepped in-line gear, the small gear of the second stepped in-line gear is engaged with the internal teeth of the duplex gear disc, while the external teeth of the duplex gear disc is engaged with the tape gear via the transmission gear, the tape gear is coaxially connected with the large wheel for sending the tape. The gear train is compact in structure and small in size and has smooth performance of transmission.

A very beneficial improvement, the said detent-type clutch member is equipped with detent along the internal circumference of the duplex gear disc, the end of the detent near the center is swaying-able to be mounted on the inner casing of the duplex gear disc, and the other end of the detent is supported on the ratchets inside the flange of the annular reel by the force of a plate spring. With its compact structure and small size, it can sufficiently utilize the existing space and is easy in assembly. Besides, it has little resistance of transmission, small power wastage of the motor and long service life of the motor.

There are two detents pivotally and symmetrically mounted on the circumference of the duplex-gear disc inner casing, ensuring even stress and reliable operation of the detent-ratchet device, which has few components, therefore the cost is reduced.

Another improvement is that the said fixing shaft is made as a hollow shaft sleeve, in which the motor is mounted, this design reduces the volume of installation and compacts the volume of the power-operated tape measure.

Finally, the power supply unit adopts batteries, chargeable batteries or solar batteries. Chargeable batteries are connected with the charging socket on the outside surface of the case via the connecting wire and solar batteries are attached to the outside surface of the case, allowing the power-operated tape measure more suitable for field operation.

Comparing with existing technologies, advantages of the present invention are as follows: when sending or withdrawing the tape, the power-operated tape measure drives the tape to be pulled out through the cooperative structure of the large and the small wheel; when withdrawing the tape, the small wheel is detached from the large wheel, then no wheel will cling to the tape, thus no resistance will be produced; the present invention withdraws the tape by the reverse turning of the motor, which reduced the resistance greatly; the structure is simple and rational, the operation is trustable and convenient, the sending and withdrawal of the tape is swift, smooth and reliable.

DETAILED DESCRIPTION OF THE PREFERRED EMBODIMENT

Now, let's give more detailed description for the invention with reference to the attached drawings.

Figure 2:
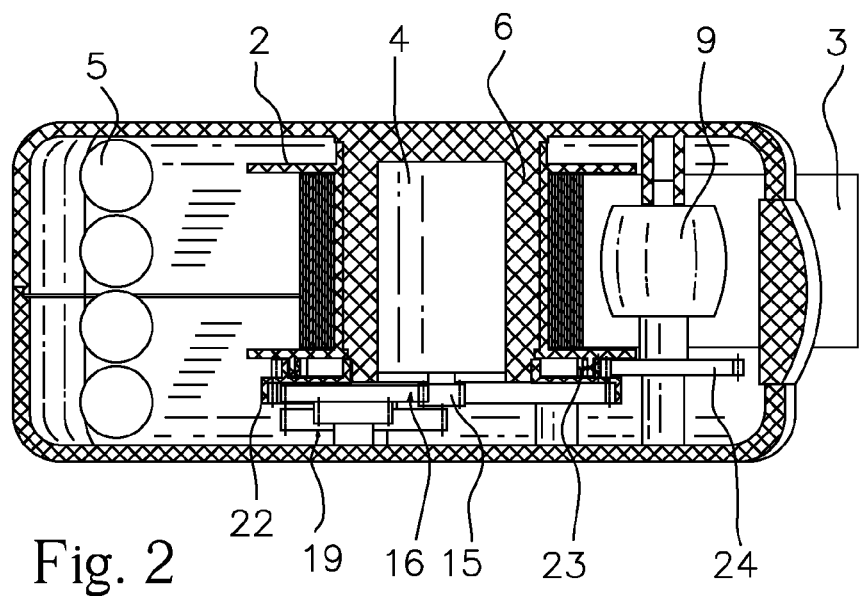
FIG. 2 is an A-A line section view of the present invention.
Figure 3:
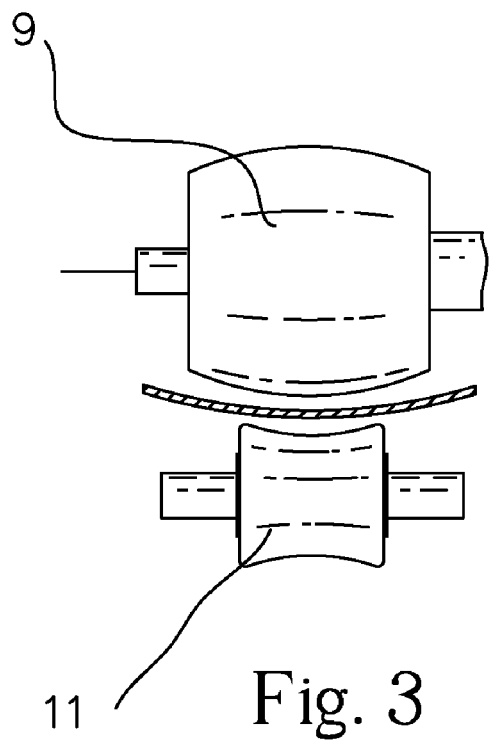
FIG. 3 is a front section view of the tape-sending wheels.
Figure 4:
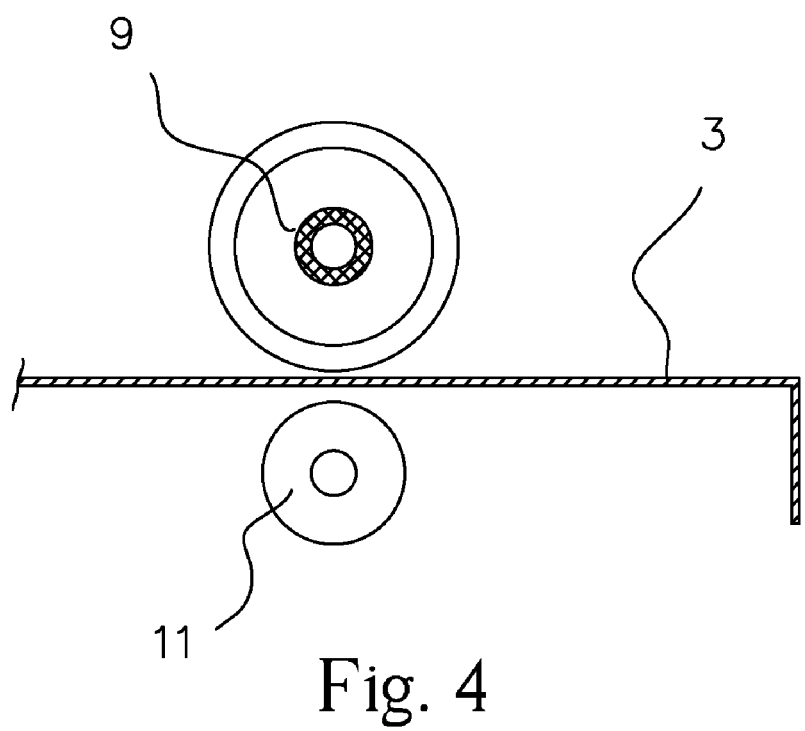
FIG. 4 is a side section view of the tape-sending wheels.

As shown in the figures, this kind of power-operated tape measure comprises a case 1, an annular reel 2, a tape 3, a motor 4, batteries of the power supply unit 5, control switches, a gear train and a detent-type clutch member etc. Where, the case 1 includes the upper case and the lower case by pairing before fixing with bolts. The fixing shaft 6 is mounted at the center of the case 1, see FIG. 2. The fixing shaft 6 is made as a hollow shaft sleeve, the motor 4, as the power section, is mounted in the shaft sleeve. The annular reel 2 is pivotally mounted on the fixing shaft 6. In order to reduce the friction and improve the flexibility of the revolving of the annular reel, a bearing may be mounded between the annular reel and the fixing shaft. The tape 3 is wound on the annular reel, the hook 7 at one end of the tape 3 extends out of the case through the outlet 8 of the case. There is a battery chamber at the back of the case 1, where the batteries are received as the power supply unit 5.

Figure 1:
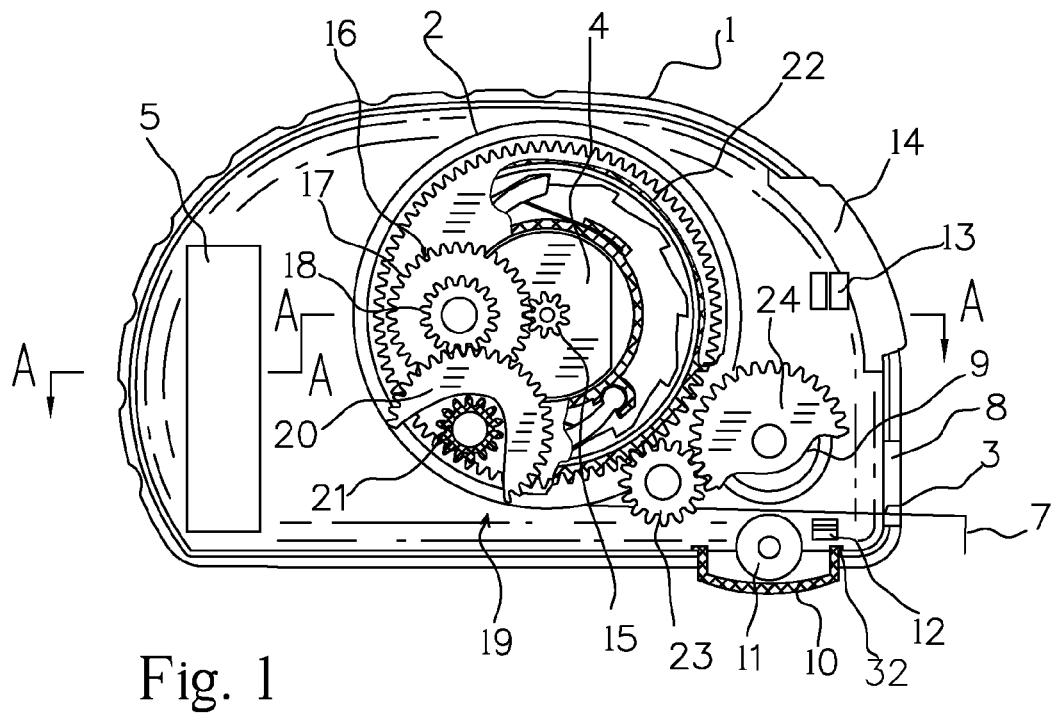
FIG. 1 is a front section view of the present invention.
Figure 5:
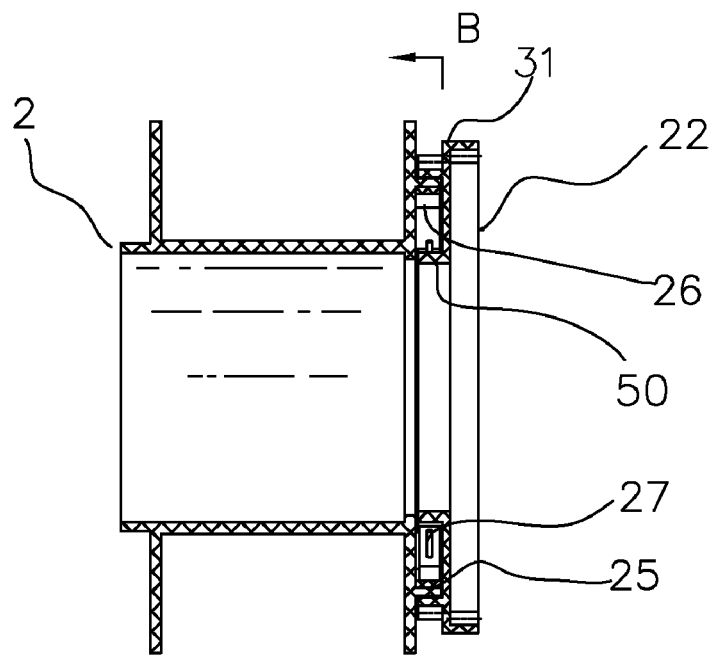
FIG. 5 is a front view of the detent-type clutch member.

The gear train comprises a first stepped in-line gear 16, a second stepped in-line gear 19, a duplex gear disc 22, a transmission gear 23, and a tape gear 24 etc. The first stepped in-line gear 16, second stepped in-line gear 19, transmission gear 23 and tape gear 24 are mounted in the case 1 with locating shafts, the duplex gear disc 22 is mounted on the flange 25 of the circumference of the annular reel 2 via the one-way transmission detent-type clutch member, see FIG. 5. The large gear 17 of the first stepped in-line gear is engaged with the small gear 15 on the output shaft of the motor, and the small gear 18 of the first stepped in-line gear is engaged with the large gear 20 of the second stepped in-line gear, the small gear 21 of the second stepped in-line gear is engaged with the internal teeth of the duplex gear disc 22, the external teeth of the duplex gear disc 22 is engaged with the tape gear 24 via the transmission gear 23, the tape gear 24 is coaxially connected with the large wheel for sending the tape 9. The gear train enables the motor 4 to drive and connect annular reel 2 and the large wheel for sending the tape 9 on the tape, see FIG. 1.

Figure 6:
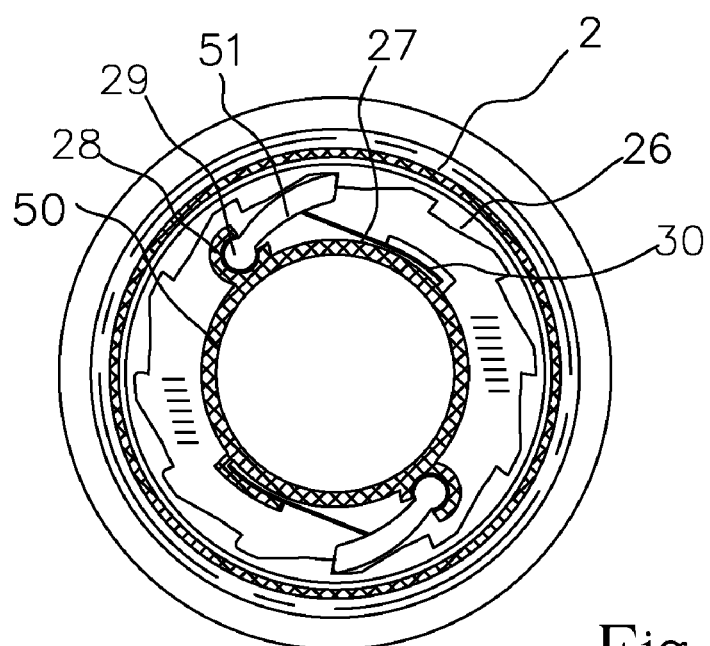
FIG. 6 is a B-B line section view of the detent-type clutch member.

The detent-type clutch member is equipped with two detents 51, which are pivotally and symmetrically allocated on the circumference of the duplex gear disc inner casing 50 along the internal circumference of the duplex gear disc 22. There is a shaft 29 at the end of the detent 51 near the center, there is a shaft sleeve 28 with an outlet on the circumference of the duplex gear disc inner casing 50, the detent 51 engages the shaft sleeve with an outlet via the shaft 29, the detents 51 is swaying-able to be mounted on the duplex gear disc inner casing 50. The end of the detent 51 near the outside is supported on the ratchet 26 located on the flange 25 of the annular reel. The detent 51 and the duplex gear disc inner casing 50 are supported by spring plate 27. A fixing groove 30 is formed on the circumference of the duplex gear disc inner casing 50, allowing the spring plate 27 inserted in the duplex gear disc inner casing 50. The duplex gear disc inner casing 50 is integrated with the duplex gear disc outer casing 31 via the connecting component to form the duplex gear disc 22. The internal and external teeth of the duplex gear disc 22 are formed respectively on the outer circle and the inner circle of the duplex gear disc outer casing 31, see FIGS. 5 and 6. The detent-type clutch member functions to make the annular reel 2 and the duplex gear disc 22 turning synchronously via the clutch member when the duplex gear disc 22 turns clockwise so as to make the tape 3 to be wound back to the annular reel 2, while the duplex gear disc 22 turns anticlockwise, the annular reel 2 is detached from the duplex gear disc 22 via the clutch member so as to avoid synchronously turning, thus making the tape 3 swiftly and smoothly pulled out from the annular reel 2 by the clinging tape of the large wheel 9 and the small wheel 11 for sending the tape.

The key point of the present invention is that the case 1 is equipped with a button 10 at the bottom side that can float upwards and downwards. There is a mounting hole at the bottom of the case 1, the button 10 with the shape and the size matching to that of the mounting hole is settled flexibly in the mounting hole and is normally limited in the mounting hole by the limiting ring 32 inside the button 10 to prevent the button from dropping. A small wheel 11 for sending the tape is pivotally mounted inside the button 10 with a shaft, allowing the small wheel to move toward to the large wheel 9 so as to cooperate with it to send the tape 3, see FIG. 1.

The control switches includes the switch 12 controlling the extending of the tape and the switch 13 controlling the withdrawal of the tape, both of which adopt inching switches. The switch 13 controlling the withdrawal of the tape is mounted at the upper front inside the case 1, it engages with the button 14 on the case. The switch 12 controlling the extending of the tape is mounted inside the case near the outlet of the case, it engages with the button 10. The electronic elements are connected by an electronic control circuit, which controls the direct turning, reverse turning and stopping of the motor. The switch 12 controls the extending of the tape and the switch 13 controls the withdrawal of the tape. Once the switch 12 or the switch 13 is pressed, the motor 4 will turn directly or reversely, when the switch 13 or 14 is released, the motor 4 will be stopped.

Certainly the power supply unit 5 can adopt chargeable batteries, connected with the charging socket on the surface of the case with the connecting wire, or the solar batteries, attached on the surface of the case, to form a circuit with the motor and the control switch via the connecting wire.

The operation procedure of the present invention is as follows: when you need to pull out the tape from the case of the power-operated tape measure for measurement, press the button 10 at the bottom side of the case to make the button 10 of the case and the small wheel 11 upward to push the switch 12 (controlling the extending of the tape), the control circuit makes the motor 4 turn anticlockwise, the motor makes the duplex gear disc 22 turn anticlockwise via the first stepped in-line gear 16 and the second stepped in-line gear 19 in the gear train, then due to the function of the detent-type clutch member, the annular reel 2 is detached from the duplex gear disc 22, at the same time, the external teeth of the duplex gear disc 22 is engaged with the tape gear 24 via the transmission gear 23 to make the large wheel for sending the tape 9, besides, as the small wheel 11 ascends to cling to the large wheel 9 to clamp the tape 3 in between, the tape 3 is pulled out from the annular reel 2 and smoothly extended to the outside by the friction till the button 10 is released or the tape 3 is totally released. When you need to withdraw the tape after the measurement, press the button 14 at the front of the case, then the button 10 is at released and descended status and the small wheel 11 also returns to the original position downwards to be detached from the tape 3 and not clinging to the large wheel 9, therefore, there's no friction between the tape 3 and the large and small wheel, after the button 14 at the front of the case is pressed, it pushes the switch 13 controlling the withdrawal of the tape, the control circuit makes the motor 4 turn clockwise and the duplex gear disc 22 turn clockwise via the first stepped in-line gear 16 and the second stepped in-line gear 19 in the gear train, due to the function of the detent-type clutch member, the annular reel 2 and the duplex gear disc 22 are made to turn clockwise synchronously to ensure the tape 3 be smoothly and easily withdrawal to the annular reel till the button 14 is released or the tape 3 is totally wound.

What is claimed is:

1. A power-operated tape measure comprising:
   a case, a annular reel, a tape, a motor, a power supply unit and control switches;
   the annular reel mounted pivotally on a fixing shaft of the case;
   the tape wound on the annular reel, a hook at one end of the tape extending out of the case through an outlet on the case;
   the motor respectively driving the annular reel and a large wheel for sending the tape via a gear train;
   the motor, the power supply unit and the control switches being combined as a control circuit controlling the direct and reverse turning of the motor; wherein
   the case being equipped with a button at the bottom that can float upwards and downwards, a small wheel is mounted pivotally inside the button to assorting to the large wheel for sending the tape on the annular reel;
   the control switches including a switch controlling the extending of the tape and a switch controlling the withdrawal of the tape, the switch controlling the extending of the tape is engaged with the button at the bottom.

2. The power-operated tape measure according to claim 1, wherein the switch controlling the withdrawal of the tape is mounted at the upper front inside the case and corresponding to the button at upper front of the case.

3. The power-operated tape measure according to claim 2, wherein the gear train comprises a first stepped in-line gear, a second stepped in-line gear, a duplex gear disc, a transition gear and a tape gear; the duplex gear disc is mounted on the flange of the circumference of annular reel via an one-way transmission detent-type clutch member; the large gear of the first stepped in-line gear being engaged with the small gear of the output shaft of the motor, the small gear of the first stepped in-line gear is engaged with the large gear of the second stepped in-line gear, the small gear of the second in-line gear is engaged with the internal teeth of the duplex gear disc, the external teeth of the duplex gear disc is engaged with the tape gear via the transmission gear, the tape gear is coaxially connected with the large wheel for sending the tape.

4. The power-operated tape measure according to claim 3, wherein a detent-type clutch member is provided inside the duplex gear disc, an end of a detent near the center is swaying-ably mounted on the duplex gear disc inner casing, and the other end of the detent is supported on the ratchet inside the annular reel, the detent is supported by a spring plate.

5. The power-operated tape measure according to claim 4, wherein two detents symmetrically mounted on the circumference of the duplex gear disc inner casing.

6. The power-operated tape measure according to claim 4, wherein the fixing shaft is a hollow shaft, in which the motor is mounted.

7. The power-operated tape measure according to claim 2, wherein the power supply unit adopting batteries, or chargeable batteries, or solar batteries.

8. The power-operated tape measure according to claim 1, wherein the gear train comprises a first stepped in-line gear, a second stepped in-line gear, a duplex gear disc, a transition gear and a tape gear; the duplex gear disc is mounted on the flange of the circumference of annular reel via an one-way transmission detent-type clutch member; the large gear of the first stepped in-line gear being engaged with the small gear of the output shaft of the motor, the small gear of the first stepped in-line gear is engaged with the large gear of the second stepped in-line gear, the small gear of the second in-line gear is engaged with the internal teeth of the duplex gear disc, the external teeth of the duplex gear disc is engaged with the tape gear via the transmission gear, the tape gear is coaxially connected with the large wheel for sending the tape.

9. The power-operated tape measure according to claim 8, wherein a detent-type clutch member is provided inside the duplex gear disc, an end of a detent near the center is swaying-ably mounted on the duplex gear disc inner casing, and the other end of the detent is supported on the ratchet inside the annular reel, the detent is supported by a spring plate.

10. The power-operated tape measure according to claim 9, wherein two detents symmetrically mounted on the circumference of the duplex gear disc inner casing.

11. The power-operated tape measure according to claim 9, wherein the fixing shaft is a hollow shaft, in which the motor is mounted.

12. The power-operated tape measure according to claim 1, wherein the power supply unit adopting batteries, or chargeable batteries, or solar batteries.

* * * * *